(12) United States Patent
Clarke (10) Patent No.: US 8,831,192 B1
(45) Date of Patent: Sep. 9, 2014

(54) TELEMARKETER IDENTITY VERIFICATION

(71) Applicant: International Buisness Machines Corporation, Armonk, NY (US)

(72) Inventor: Michael Paul Clarke, Ellenbrook (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/875,055

(22) Filed: May 1, 2013

(51) Int. Cl.
  *H04M 15/06* (2006.01)
  *H04W 4/12* (2009.01)
  *H04M 3/42* (2006.01)

(52) U.S. Cl.
  CPC ............ *H04M 3/42042* (2013.01); *H04W 4/12* (2013.01)
  USPC ............. 379/142.06; 379/211.01; 379/211.02

(58) Field of Classification Search
  USPC ............................ 379/142.06, 211.01, 211.02
  See application file for complete search history.

(56) References Cited

U.S. PATENT DOCUMENTS

| | | | |
|---|---|---|---|
| 7,212,620 | B1 | 5/2007 | Mastro |
| 7,295,660 | B1 | 11/2007 | Higgenbotham et al. |
| 2004/0114747 | A1 | 6/2004 | Trandal et al. |
| 2007/0036136 | A1 | 2/2007 | Barclay et al. |
| 2009/0168755 | A1* | 7/2009 | Peng et al. ..................... 370/352 |
| 2010/0046507 | A1 | 2/2010 | Rosenberg et al. |
| 2013/0195257 | A1* | 8/2013 | Wood et al. .................. 379/67.1 |

OTHER PUBLICATIONS

Robison, "Can you stop robocalls?" published on-line Mar. 14, 2012, http://boomersurvive-thriveguide.typepad.com/the_survive_and_thrive_bo/2012/03/can-you-stop-robocalls.html.
"Telemarketing blacklisting using Asterisk" published on-line Mar. 17, 2009 http://www.it-slav.net/blogs/2009/03/17/telemarketing-blacklisting-using-asterisk/.

* cited by examiner

*Primary Examiner* — Creighton Smith
(74) *Attorney, Agent, or Firm* — Jeffrey S. LaBaw; David H. Judson (57) ABSTRACT

Telemarketer identity verification uses an application executing in a smartphone or tablet device. When a call is received, the application takes the number and attempts to verify whether it is associated with a known telemarketer. If so, the application queries the telemarketing service for additional data about the call. The service responds with additional details, for example, the subject of the intended call. The user is then provided an notification that an incoming call is being received. At this point, the user knows that the call is from a telemarketer, that the telemarketer has been verified, and the nature of the call. This information is then output to the user, e.g., visually, aurally, physically, or some combination thereof. The visual representation may include a "decline" button that may be selected by the user. If the call is declined, the client application may then notify the telemarketing service to that effect.

20 Claims, 5 Drawing Sheets

TELEMARKETER IDENTITY VERIFICATION

BACKGROUND OF THE INVENTION

1. Technical Field

This disclosure relates generally to information security and, in particular, to preventing a calling entity from obtaining a user's sensitive information during a telephone call interaction.

2. Background of the Related Art

Telemarketing (sometimes referred to as "telesales") is a method of direct marketing in which a salesperson solicits prospective customers to buy products or services, either over the phone or through a subsequent face to face or Web conferencing appointment scheduled during the call. A recent trend in telemarketing is to use automated telephone calls that use both computerized auto-dialers and computer-delivered pre-recorded messages in a sales pitch. Often, however, telemarketing calls quickly lead to requests for sensitive personal information, such as credit card numbers, income estimates, family details, and the like. Naturally, this leads to the question of whether the person (whether live or automated) on the originating end of the telemarketing call is who he or she purports to be, as opposed to someone or some entity undertaking a phishing inquiry or the like.

There are known techniques for preventing telemarketer fraud. In one approach, an anti-telemarketing program uses calling party identification of an incoming call to determine if the call is a telemarketing call by accessing a telemarketing database. The incoming call can be identified as a telemarketing call by direct correlation with a known telemarketing number or by indirect correlation by not being included within a list of known non-telemarketing numbers. If an incoming call is identified as a telemarketing call, and no override condition is set, the call will not be allowed to ring through to the desired phone line; instead, it will be terminated by a call progress tone or by a notification that the desired phone line does not accept calls from telemarketers. If an incoming call is not identified as a telemarketing call, it will be completed, and if it is from a telemarketer, the party receiving the call can designate the calling party identification from the call as belonging to a telemarketer. The designated calling party identification can be added to the telemarketing database when a preselected criterion for addition, such as independent verification or designation of the same number by multiple parties, is met.

Other known techniques include providing a messaging service platform that may include or access a telemarketer blacklist. The telemarketer blacklist includes the name associated with a calling party incorporated into the caller identification (caller ID) signaling. In another implementation, the telemarketer blacklist includes the telephone number of the calling party. A different approach involves providing a call processing system that includes the capability of making a determination or inference that the calling party is or may be a telemarketer. The inference may be based on one or more criteria. For example, an inference or determination can be made that a caller is a telemarketer based on one or more of the following conditions: Caller ID unavailable, Caller ID available but private, and Caller ID available and matches known or previously suspected telemarketers based on a comparison of at least a portion of the Caller ID information with information stored in a centralized, publicly or generally available database, such as one maintained by a governmental authority that stores phone numbers and the like associated with telemarketers, or from a proprietary database maintained by the call processing system.

While the above-described approaches generally work for their intended purposes, there remains a need to provide enhanced telemarketer identity verification techniques.

BRIEF SUMMARY

According to this disclosure, telemarketer identity verification is facilitated using a client application that executes in or in association with a telephone receiving device, such as a smartphone or tablet device. When a call is received, the client application takes the number (from caller ID) and first attempts to verify (using a verification agency) whether the caller ID number is associated with a known telemarketer. If, as a result of this verification, the client application determines that the call is from a legitimate telemarketing service, the client application then queries (via a "call query") the telemarketing service for additional data, e.g., the purpose of the call. To that end, the client application forwards the query, the calling number and perhaps other data (e.g., such as the called number, local IP address, or the like) back to a computer system associated with the telemarketing service. The telemarketing service responds with additional details regarding, for example, the subject of the intended call. This response is processed by the client application and initiates the usual notification (that an incoming call is being received). At this point, however, the client application knows that the call is from a telemarketer, that the telemarketer has been verified as being legitimate, and perhaps the nature and purpose of the call. This information (or portions of it) are then output to the user, typically in a visual manner (on a display associated with the telephone receiving device), aurally, physically, or some combination thereof. The visual representation may include a "decline" button (or soft key) representation that may be selected by the user. If the call is declined, the client application may then notify the telemarketing service to that effect. If the call is accepted, the client application outputs appropriate information to the user that may include presentations or other interactive content returned as a result of the call query.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN
ILLUSTRATIVE EMBODIMENT

The techniques herein rely upon various enabling technologies, which are now described.

Figure 1:
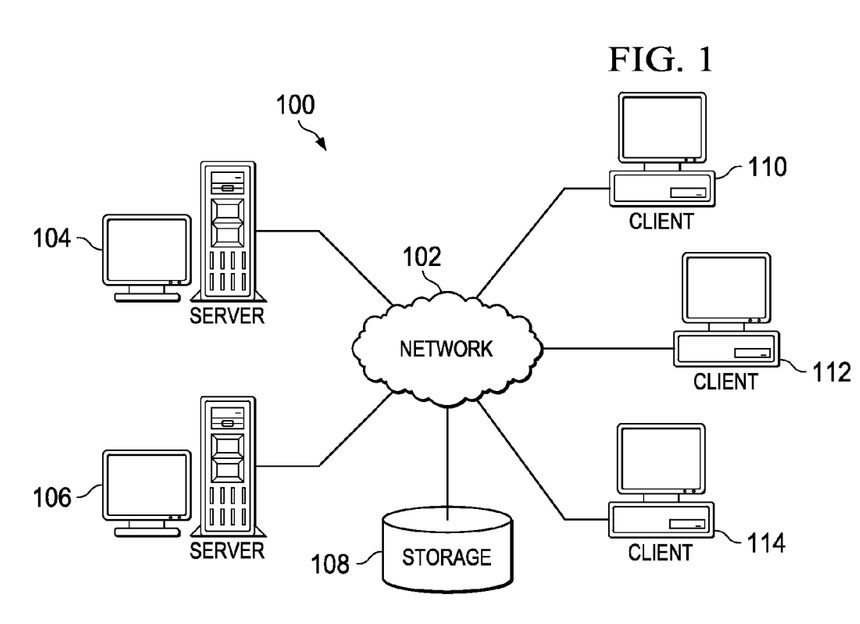
FIG. 1 depicts an exemplary block diagram of a distributed data processing environment in which exemplary aspects of the illustrative embodiments may be implemented.
Figure 2:
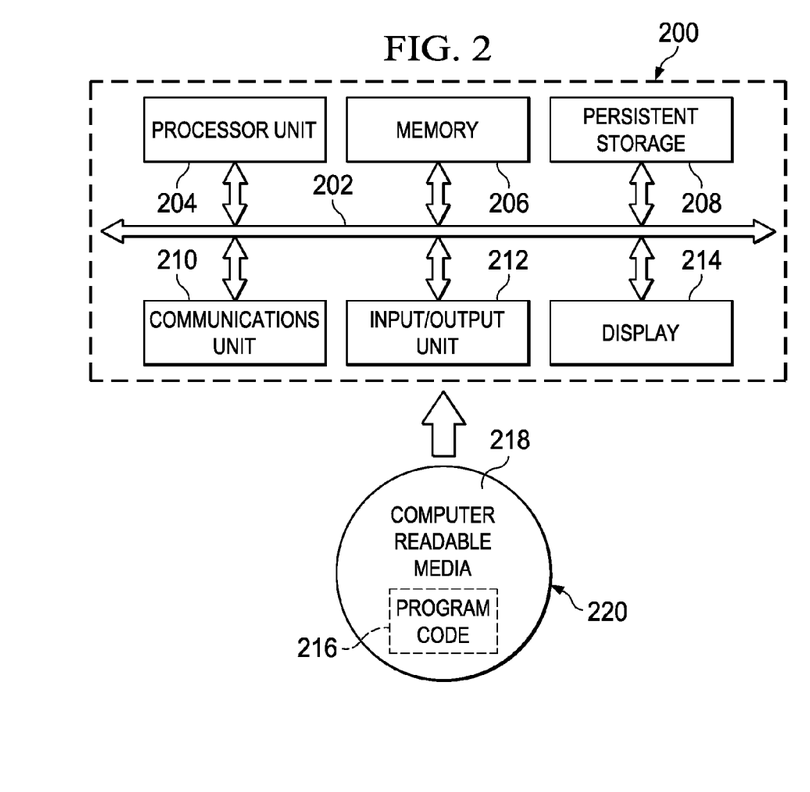
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Mobile Device Technologies

Mobile device technologies also are well-known. As will be described below, the client application of this disclosure may execute on one such device; thus, the following section provides additional details regarding a device of this type.

Figure 3:
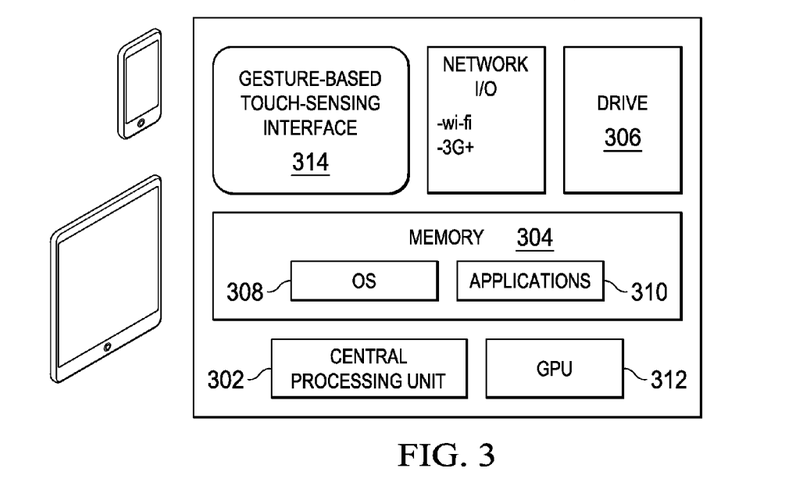
FIG. 3 illustrates a representative mobile device on which the client application of this disclosure may be implemented.

In particular, a mobile device is a smartphone or tablet, such as the iPhone® or iPad®, an Android™-based mobile device, or the like. As seen in FIG. 3, a device 300 of this type typically comprises a CPU 302, computer memory 304, such as RAM, and a data store 306. The device software includes operating system (e.g., Apple iOS, Android, Blackberry OS, or the like) 308, and generic support applications and utilities 310. Typically, the device includes a separate graphics processing unit (GPU) 312. A touch-sensing device or interface 314, such as a touch screen, is configured to receive input from a user's touch and to send this information to processor 312. The interface 314 responds to gestures on the touch sensitive surface. Other input/output devices include software-based keyboards, cameras, microphones, and the like.

More generally, the mobile device is any wireless client device, e.g., a cellphone, pager, a personal digital assistant (PDA, e.g., with GPRS NIC), a mobile computer with a smartphone client, or the like. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Thus, a mobile device as used herein is a 3G—(or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices. The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

Telemarketing Service

Figure 4:
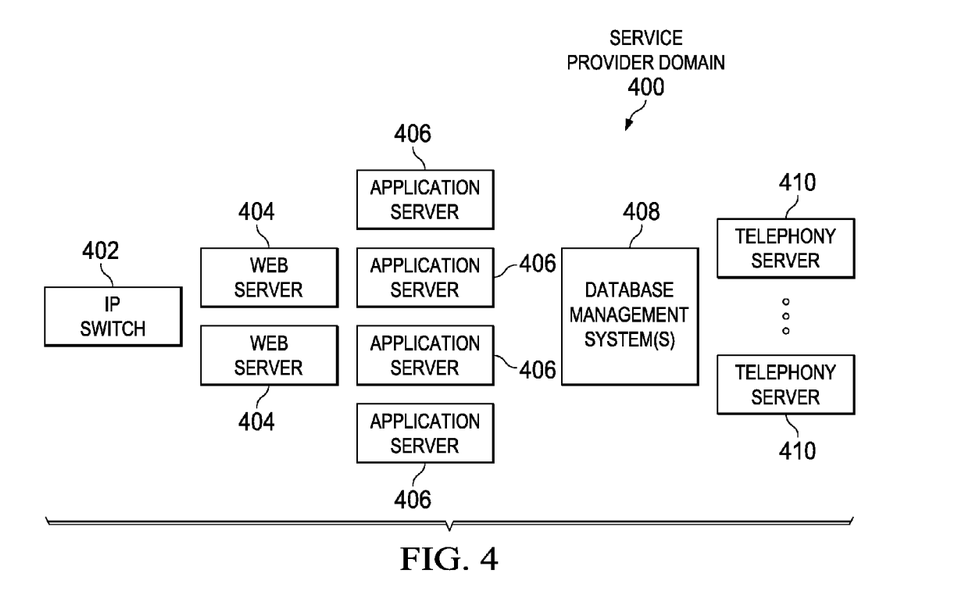
FIG. 4 illustrates a representative telemarketer service architecture in which the disclosed subject matter may be implemented.

As seen in FIG. 4, a representative telemarketing service provider architecture 400 for automated calling comprises an IP switch 402, a set of one or more web server machines 404, a set of one more application server machines 406, a database management system 408, and a set of one or more telephony server machines 410. Generally, the web servers 404 handle incoming business entity provisioning requests, and they export a management interface. The application servers 406 manage the business logic. For voice messaging, the telephony servers 410 handle most telephony-related functions including, without limitation, executing outbound calls and forwarding calls to a contact center. A telephony server machine is an application server that implements appropriate software applications for call set-up, voice processing, and other call connection and management activities. In the alternative, a telephony server machine may execute an application server in conjunction with one or more PSTN, VoIP and/or voice processing cards that provide interconnectivity for telephone-based calling applications. For human-initiating calling, the architecture includes (or has associated therewith) agent workstations, which typically are desktop computers or workstations that include dedicated agent calling software applications and web-based or other interfaces.

Telemarketer Identity Verification

With the above as background, the subject matter of this disclosure is now described.

Figure 5:
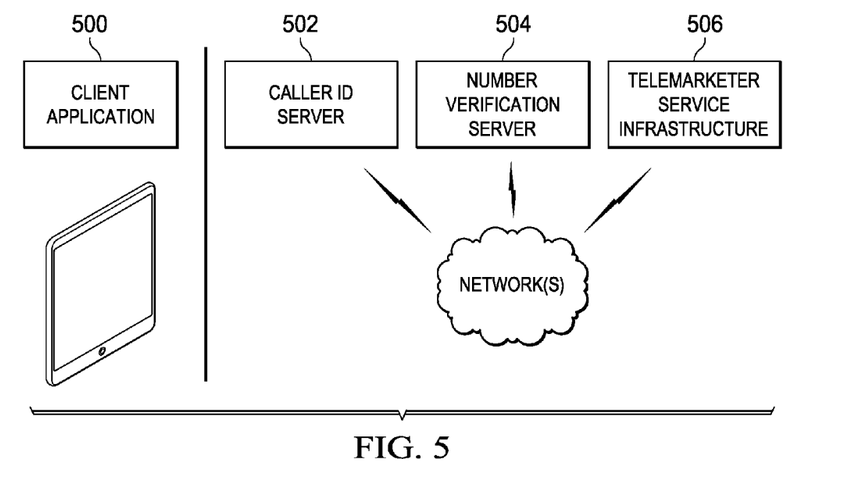
FIG. 5 illustrates a telemarketer identity verification system according to this disclosure.

As illustrated in FIG. 5, according to this disclosure, a telemarketing identity verification system typically comprises a set of elements: a client application 500, a Caller (or "Number") ID server 502, a Caller (or "Number") verification server 504, and a telemarketing entity service 506. The client application 500 typically is a software application that executes on a smart phone or tablet device associated with a user (such as shown in FIG. 3 and described above). The Caller ID server 502 is a server that acts as a broker to make a connection between a telephone number and an identity verification service that is responsible for verifying the identity of a telemarketer calling from that telephone number. The number verification server 504 is a server responsible for validating whether a number actually is registered with a telemarketing organization or entity. Representative servers may be implemented as described in FIG. 1. The telemarketing entity service 506 comprises service provider or system architecture for initiating the telemarketing calls, as has been described with respect to FIG. 4. The individual elements above have logical relationships but need not be part of an integrated system. Thus, different individuals or entities may manage or operate the servers 502 and 504, as well as the telemarketing service 506. Typically, the client application 500 is associated with a user's home telephone network/system, although this is not a limitation either. An individual may only have a mobile device, and the techniques herein may be used for telemarketer identity verification in the event the mobile device receives (or might be adapted to receive) these types of unsolicited calls.

Generalizing, and according to this disclosure, telemarketer identity verification is facilitated using the client application 500 that executes in or in association with a telephone receiving device. Any telephone receiving device can suffice, including, for example, conventional telephones, computer-controlled digital phone or tablet devices (such as shown in FIG. 3), other mobile devices, paging devices, other pervasive computing devices, and the like. In the usual case, and as well-known, caller identification data associated with calling party is included as part of the call that is interpreted by the telephone receiving device.

According to one aspect of the approach herein, when a call is received (and preferably before it is answered, or even before a ringing or other indication is provided to the user), the client application takes the number (from caller ID) and first attempts to verify (using a verification agency) whether the caller ID number is associated with a known telemarketer. If, as a result of this verification, the client application determines that the call is from a legitimate telemarketing service, the client application then queries the telemarketing service for additional data, e.g., the purpose of the call. To that end, the client application forwards the query, the calling number and perhaps other data (e.g., such as the called number, local IP address, or the like) back to a computer system associated with the telemarketing service. The telemarketing service responds with additional details regarding, for example, the subject of the intended call. Although not required, the client application may provide a subject-based filtering function (e.g., a blacklist of subjects to block, a whitelist of subjects to permit, or the like). The response from the telemarketing service is again intercepted by the client application and, perhaps depending on the filtering options, receipt of this response initiates notification (that an incoming call is being received). At this point, however, the client application knows that the call is from a telemarketer, that the telemarketer has been verified as being legitimate, and perhaps the nature and purpose of the call. Assuming the incoming call is not being blocked (e.g., due to a filtering option being triggered), this information (or portions of it) are then output to the user, typically in a visual manner (on a display associated with the telephone receiving device), aurally, physically (by vibration, etc.), or some combination thereof. The visual representation may include a "decline" button (or soft key) representation that may be selected by the user. As will be described, the visual representation may include soft keys for "block-subject" and/or "block-telemarketer". If the call is declined, the client application may then notify the telemarketing service to that effect.

In the approach as described herein, the data link between the client application and the telemarketing service computing can be used to provide other information, both from the end user to the service, and from the service to the end user. Thus, for example, the telemarketer may provide electronic information (e.g., brochures, videos, web site links, applications, or other content) that may be relevant to the inbound call.

In the alternative, the client application can be configured to decline all identified telemarketing calls. Another alternative is that the client application is configured to prompt the telemarketer with a list of one or more subjects that the user might be interested in talking about with a telemarketer; in the latter case, if the telemarketer does not have information about any of the one or more subjects, the telemarketer can act appropriately to terminate the inbound inquiry.

In the event that the client application cannot identify the telemarketer or verify its identity, the application may provide the user with a way to redirect the call (once answered) to another location or call center associated with a verification agency so that the telemarketer can receive information about the merits of using such an agency.

The following provides additional details regarding an implementation of the client application 500 (in FIG. 5). Reference should also be made to the process flow shown in FIG. 6.

Figure 6:
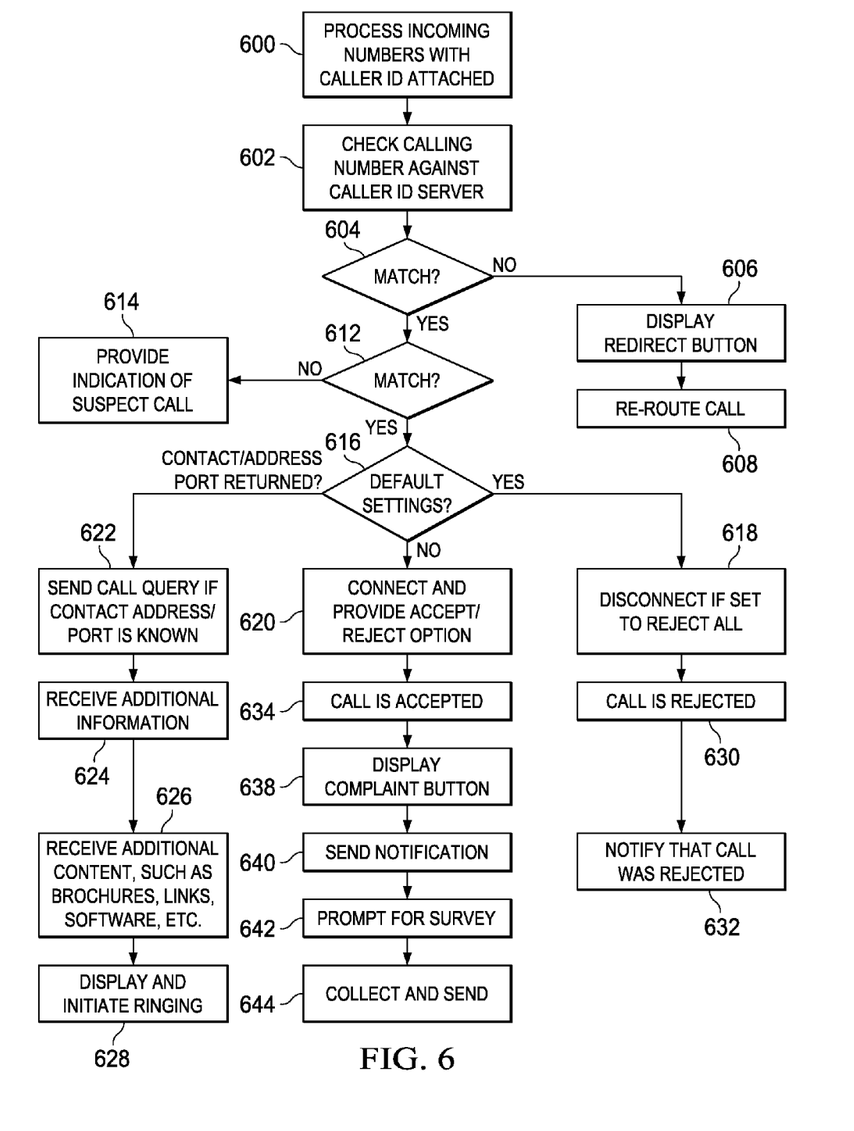
FIG. 6 illustrates a representative process flow for a client application of the telemarketer identity verification system.

Once the client application is started, the routine begins at step 600 to process any incoming phone numbers with Caller ID. At step 602, the application checks the number against a "Caller ID" server. A test is then performed at step 604 to determine if there is a match. If the outcome of the test at step 604 indicates that no match is found, the routine branches to step 606 with the client application displaying a redirect button to the user (e.g., via a display interface). If the user presses the redirect button, at step 608 the call is re-routed to a call center (or the like) associated with the telemarketing identity verification service. Typically, the user only redirects the call in this manner if the call is from an unrecognized (and thus unverified) telemarketer.

The Caller ID server typically returns a "port" or other identifier for the verification service that is validating the telemarketer on the phone number identified by the Caller ID. At step 612, the client application performs a test to check with the verification service to determine whether the telemarketer can be identified. If there is no match (or a negative match), the call is suspect. Control then branches to step 614 to provide an indication to the user to that effect; preferably, this indication is provided before the call is answered.

If the verification service has returned a positive confirmation on the number identified by the Caller ID (indicating that the call comes from a currently registered or otherwise identified telemarketer), preferably the routine continues at step 616 by checking default settings associated with the client application. If the client application is set to reject all telemarketers (by default), the call is disconnected. This is step 618. This setting is configurable and may vary depending, for example, on the day of the week or the time of day. When the call is disconnected in this manner, the telemarketer may be notified of this "rejected by default" response, which information may then be used by the telemarketer to take a given action, such as to remove the number from an active call list or place the number on a lower frequency call list. In addition, information about when telemarketer calls are acceptable may also be passed back to the telemarketer.

If, however, the client application is set to accept telemarketer calls, an indication that the incoming call is from a telemarketer is provided to the user, and the user is provided an option to accept or reject it. This is step 620. Thus, for example, the client application may display accept/reject buttons that can be selected by the user.

If the verification service also returned a contact address/port for the telemarketer, the client application may optionally send an inquiry to that address/port. This is step 622. The inquiry may include the calling phone number, the phone number called, and other data. In this scenario (where the verification service returns its contact address), the verification service may also return additional information, such as the name of an operative (if already assigned), the subject of the call, or the like. This is step 624. In a further variant, the additional information may include the URLs (or other addresses) for various types of electronic information that are pertinent to the call, such information including, without limitation, brochures, videos, applications, and other digital content. This is step 626. Although not shown, it may be desirable to incorporate a virus check (or other such examination) of the digital content and/or the address information identified to ensure that the material is not being provided from a suspect site. At step 628, the client application will then display this additional information along with the accept/reject buttons. Typically, at this point the telephone typically starts ringing, as it is now ready to interact with the user.

At this point, and upon being notified of the call (typically by the ringing), the user may reject the call. This is step 630. If the reject button is pressed, the client application disconnects the call and notifies the telemarketing organization (for example) that the call was rejected. This is step 632. The telemarketing organization may then use this information, for example, to adjust a probability of the number being called again for the same subject.

The user, in the alternative, may accept the call (e.g., by selecting a "connect" button). This is step 634. If the connect button is pressed, the call is answered, and any presentation material or the like is made available on the device as well (e.g., by launching an appropriate reader or other rendering application). This is step 628, previously described. In an alternative, an interactive presentation utility is launched, and that utility may be controlled by the telemarketer or otherwise enabled to provide a customized (or value-added) presentation.

In the accept call scenario, the client application may display a "complaint." This is step 638. The user may then use this button as he or she wishes, for example, to lodge a complaint about the telemarketer who is speaking to the user. In the event that the button is selected during the call, the routine continues at step 640 to send the complaint (perhaps with a textual or spoken explanation) directly to the telemarketing organization, along with other call details as desired or necessary.

As the call ends (or is ending), the telemarketer may prompt the user to complete a survey concerning the call. If the user agrees, the survey data is collected at step 642. At step 644, the results are sent directly to the telemarketer organization, or to some other intermediary.

Figure 7:
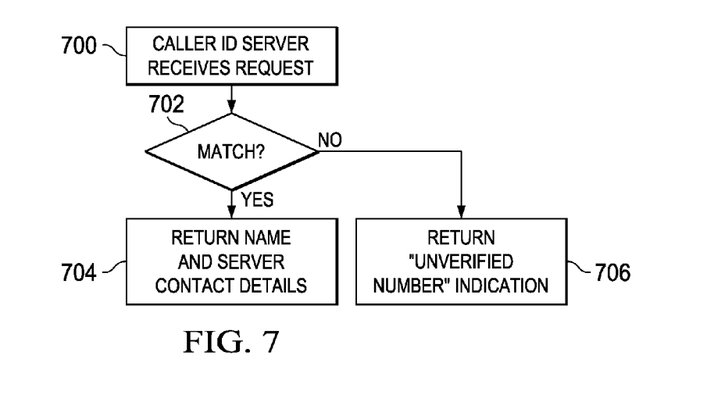
FIG. 7 illustrates a representative process flow for a Caller ID server of the telemarketer identity verification system.

The following provides additional details regarding an implementation of the Caller ID server 502 (in FIG. 5). Reference should also be made to the process flow shown in FIG. 7. As noted above, the Caller ID server is the server that acts as a broker to make a connection between, on the one hand, an originating or calling telephone number, and, on the other hand, an identity verification service that is responsible for verifying the telemarketer calling from that number. The processing routine begins at step 700 upon the Caller ID server receiving a request that includes a calling phone number. At step 702, the server searches its database to determine if there is a match. If the number can be matched, the server returns the name (and server contact details) of the identity verification service. This is step 704. If there is no match, the server returns an "unverified number" indication or the like. This is step 706.

The Caller ID server may be omitted in an implementation that is specific to just a single identity verification service, in which case the address of the identity verification server may be hard-coded into the mobile device (instead of using an address of the Caller ID server).

Figure 8:
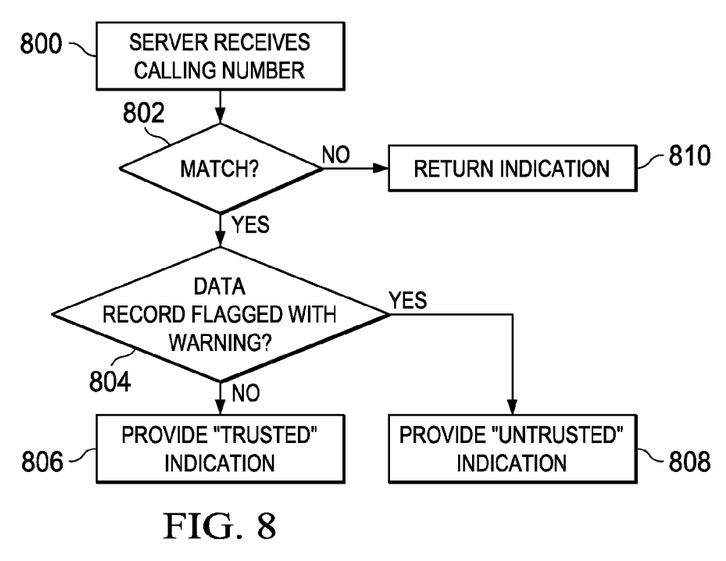
FIG. 8 illustrates a representative process flow for a Number verification server of the telemarketer identity verification system.

The following provides additional details regarding an implementation of the Number verification server 504 (in FIG. 5). Reference should also be made to the process flow shown in FIG. 8. As noted above, this server is responsible for validating whether a number is registered (or otherwise validly associated) with a telemarketing organization. The routine begins at step 800 when the server receives the calling phone number. A test is then performed at step 802 to determine if a match is found in an associated database. If a match is found, the routine continues at step 804 to check to determine whether a data record for the organization has been flagged with a "warning" or similar indication. If the outcome of the test at step 804 is negative, the routine continues at step 806 to return an indication that the organization is "trusted." If, however, the outcome of the test at step 806 is positive, the routine continues at step 808 to return an indication that that the organization is "untrusted." The verification server may also spin off "calling" records for queries, with those records then being passed back to the telemarketing companies. If the outcome of the test at step 802 is negative, an indication that the server cannot verify or validate whether a number is registered with a telemarketing organization.

Figure 9:
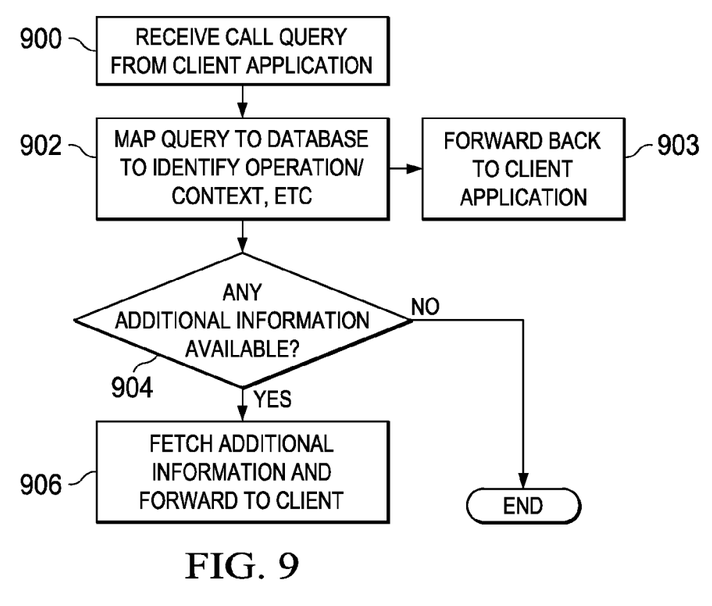
FIG. 9 illustrates a representative process flow for the telemarketing service "call query" response operation of the telemarketer identity verification system.

The following provides additional details regarding an implementation of the telemarketing service 508 (in FIG. 5). Reference should also be made to the process flow shown in FIG. 9. As noted above, the telemarketer service is a known system, although this system may be augmented to respond to a "call query" issued from the client application in the manner described above. To that end, the call query handling routine begins at step 900 upon receipt of a query, which typically comprises the number being called, as well as the telemarketer's outbound number. At step 902, this information is mapped in a database of outgoing calls to identify an operative (if any) assigned to the call and, optionally, to find information or data regarding the subject or purpose of the call. This information may then be forwarded back to the client application (step 903). In an alternative scenario, the telemarketer delays assignment of an operative to answer the call until this point, or perhaps later in the process when the telemarketer is assured that the call will not be rejected summarily or when the user actually presses the response button to accept the call. Depending on the telemarketer implementation, the client may be asked to pause until a telemarketer operative is available, at which point the phone ringing is initiated.

Returning back to FIG. 9, at step 904, an additional check may be performed to determine whether there is any associated marketing or other presentation material to be provided to the user of the client application (as noted above, preferably by providing the relevant URLs for the material). If so, this information is retrieved (by the mobile application, by a browser, or the like) and sent back to the client in response to the call query. This is step 906. The additional information may be sent separately from the information about the operative or context (subject of the call). As noted above, the additional information may provide the user more information about the call, thereby enabling the user to make a more-informed judgment regarding whether to accept the call in the first instance. The additional information may be referenced in the sales pitch itself, or it may provide an incentive to the user, or some combination thereof. As already noted above, the additional information may include visual information, interactive elements, software, or the like. Preferably, URLs are provided (instead of downloading the actual material) at least initially to reduce the processing overhead of the call answering server.

In a further alternative, the telemarketer does not have a specific subject in mind. Then, when the call query arrives at the service, it may be parsed to determine whether the client application has included information about one or more subjects that the user might be interested in learning about. If the telemarketer then has a pitch on one of these subjects available, it may then direct the call to an appropriate agent to handle the session. As a further alternative, the system may present the user, via the client application, with a menu of one or more available call subjects from which one or more may then be selected by the user.

Preferably, the service also includes appropriate functionality to receive, distinguish and accept a call denied indication and to act accordingly. This information may also be used in subsequent data analytics to provide a prediction of what types of calls the user may be more likely to accept in the future.

As also described, the services also includes appropriate functionality to receive, distinguish and accept a call "complaint" notification, as well as to optional route the indication to an appropriate person or entity for handling.

The subject matter described herein has significant advantages over the prior art in that it enables the user to have significant control over whether to answer a call from a telemarketer. The approach enables the user to obtain additional information from the telemarketer once it has been determined that the telemarketer is a legitimate (recognized) entity, thereby enhancing the interaction between the telesales operative and the user when the connection is finally established. The approach described herein takes full advantage of the processing power of the user's mobile device, in effect acting as an intelligent agent to "screen" the call, preferably before it ever reaches the user's attention. Using the approach, the user can obtain access to additional information about the caller or the call's purpose before deciding whether to accept the call in the first instance. The user can also continue to exhibit control over the call during the actual interaction by issuing a complaint that gets returned to the telemarketer or some third party.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the mobile device call intercept and display functionality is implemented in software, which includes but is not limited to firmware, resident software, microcode, and the like. As noted above, these functions may be integrated into other applications, or built into software for this specific purpose. Furthermore, the device-specific functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A computer-readable storage medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the device-specific components are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, a "client-side" application should be broadly construed to refer to an application, a page associated with that application, or some other resource or function invoked by a client-side request to the application. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

The mobile device is not limited to any particular device, configuration, or functionality. The techniques may be practiced in any device (distinct from the computing entity) and that is adapted or configured for the telemarketer screening and verification purposes described. The client application may be packaged and made available conveniently as a downloadable and installable mobile application.

Although the above-described examples refer to communication between mobile phones, examples may also refer to various other forms of communication such as instant messaging, voice over Internet Protocol (VOIP) communication, communication between paging systems, etc. In other instances, well-known instruction instances, protocols, structures, and techniques have not been shown in detail in order not to obfuscate the description.

Having described my invention, what I now claim is as follows.

The invention claimed is:

1. A method for telemarketer identity verification operative in a mobile device that includes a display, comprising:
receiving a call from a calling number;
attempting to verify that the calling number is associated with a known telemarketer;
upon verifying that the calling number is associated with a known telemarketer, issuing a query to obtain additional information about the call;
upon receipt of the additional information, providing an indication about the call using a hardware element, the indication including a representation of at least one button adapted to be selected by a user;
upon receipt of data indicating that the one button has been selected by the user, taking a given action with respect to the call.

2. The method as described in claim 1 wherein the at least one button is a call decline button, and wherein the given action includes terminating the call.

3. The method as described in claim 1 wherein the at least one button is a call accept button, and wherein the given action includes connecting the call.

4. The method as described in claim 3 further including outputting the additional information.

5. The method as described in claim 4 wherein the additional information is one of: a link, a content object, information about a purpose of the call, and information about an operative associated with the telemarketer.

6. The method as described in claim 1 further including selectively disconnecting the call based on a configurable setting.

7. The method as described in claim 3 further including:
outputting a representation of an additional button that is adapted to be selected to indicate a complaint; and
upon receipt of data indicating that the additional button has been selected by the user, providing an indication that the complaint has been generated.

8. Mobile device apparatus, comprising:
a processor;
a display; and
computer memory holding computer program instructions executed by the processor for telemarketer identity verification, the computer program instructions comprising:
code to receive a call from a calling number;
code to attempt to verify that the calling number is associated with a known telemarketer;

code operative upon verifying that the calling number is associated with a known telemarketer to issue a query to obtain additional information about the call;

code operative upon receipt of the additional information to provide an indication about the call, the indication including a representation of at least one button adapted to be selected by a user; and code operative upon receipt of data indicating that the one button has been selected by the user to take a given action with respect to the call.

9. The apparatus as described in claim 8 wherein the at least one button is a call decline button, and wherein the given action terminates the call.

10. The apparatus as described in claim 8 wherein the at least one button is a call accept button, and wherein the given action connects the call.

11. The apparatus as described in claim 10 further including code to output the additional information.

12. The apparatus as described in claim 11 wherein the additional information is one of: a link, a content object, information about a purpose of the call, and information about an operative associated with the telemarketer.

13. The apparatus as described in claim 8 further including code to selectively disconnect the call based on a configurable setting.

14. The apparatus as described in claim 10 further including:

code to output a representation of an additional button that is adapted to be selected to indicate a complaint; and code operative upon receipt of data indicating that the additional button has been selected by the user to provide an indication that the complaint has been generated.

15. A computer program product in a non-transitory computer readable storage medium for use operative in a computing entity, in association with a mobile device that includes a display, the computer program product holding computer program instructions which, when executed, perform telemarketer identity verification, the computer program instructions comprising:

code to receive a call from a calling number;

code to attempt to verify that the calling number is associated with a known telemarketer;

code operative upon verifying that the calling number is associated with a known telemarketer to issue a query to obtain additional information about the call;

code operative upon receipt of the additional information to provide an indication about the call, the indication including a representation of at least one button adapted to be selected by a user; and code operative upon receipt of data indicating that the one button has been selected by the user to take a given action with respect to the call.

16. The computer program product as described in claim 15 wherein the at least one button is a call decline button, and wherein the given action terminates the call.

17. The computer program product as described in claim 15 wherein the at least one button is a call accept button, and wherein the given action connects the call.

18. The computer program product as described in claim 17 further including code to output the additional information.

19. The computer program product as described in claim 18 wherein the additional information is one of: a link, a content object, information about a purpose of the call, and information about an operative associated with the telemarketer.

20. The computer program product as described in claim 15 further including code to selectively disconnect the call based on a configurable setting.

* * * * *